United States Patent [19]

Petsche

[11] Patent Number: 5,151,969
[45] Date of Patent: Sep. 29, 1992

[54] SELF-REPAIRING TRELLIS NETWORKS

[75] Inventor: Thomas Petsche, Cranbury, N.J.

[73] Assignee: Siemens Corporate Research Inc., Princeton, N.J.

[21] Appl. No.: 330,340

[22] Filed: Mar. 29, 1989

[51] Int. Cl.$^5$ ............................................. G06F 13/00
[52] U.S. Cl. ..................................... 395/24; 364/807; 371/9.1; 371/43
[58] Field of Search ................ 364/513, 200, 807, 2.1, 364/7; 375/96; 371/93, 9.1

[56] References Cited

U.S. PATENT DOCUMENTS

| | | | |
|---|---|---|---|
| 4,545,054 | 10/1985 | Davis | 371/43 |
| 4,591,980 | 5/1986 | Huberman et al. | 364/200 |
| 4,885,757 | 12/1989 | Provence | 375/96 |
| 4,908,751 | 3/1990 | Smith | 364/200 |

OTHER PUBLICATIONS

Petsche et al., "Trellis Codes, Receptive Fields, and Fault Tolerant, Self-Repairing Neural Networks", *IEEE Trans. on Neural Networks*, vol. 1, No. 2 Jun. 1990 pp. 154-166.
Abstract for "A Trellis-structured Neural Network", NIPS *87 book of abstracts.
Cover page from NIPS*87 book of abstracts.
"A Trellis-Structured Neural Network", Petsche et al., 1988, pp. 592-601, American Institute of Physics, New York.

*Primary Examiner*—Michael R. Fleming
*Assistant Examiner*—Roger S. Joyner

[57] ABSTRACT

A self-repairing trellis network includes a plurality of stages (11, 12 and 13) wherein a first set of N processing elements and a second set of M processing elements are situated. The N processing elements are normally active while the M processing elements are designated as spares. The stages are connected together by paths through variable weighing circuits which are legal or illegal. In response to a combination of input bits, an arrangement maps bit groupings onto the stages to turn on selective cells which form nodes coupled by paths. Only certain paths (legal paths) are tolerated in accordance with convolution coding of the input bit combination. If an error is present, an illegal path attempts to form from the legal path which starts a process of error detection and correction wherein a spare cell may be substituted for a failed cell. Since the substitution serves to maintain the redundancy status of the network, subsequent failures will be detected and corrected.

11 Claims, 9 Drawing Sheets

SELF-REPAIRING TRELLIS NETWORKS

BACKGROUND OF THE INVENTION

The present invention relates to self-repairing networks, and it relates, more particularly, to modified networks for producing a neural network exhibiting the ability to repair itself upon faults of its constituent processing elements while correctly interpreting input data subject to noise or errors.

Parallel processors or processor arrays or matrices are known and beginning to be used in a variety of fields, ranging from numerical methods and robotics, to cognitive processes such as vision and speech sensing and interpretation. A set or collection of a number of identical processing elements connected in a network capable of storing information and processing information can provide a significant signal processing function known as contrast enhancement. Such collections can be combined to form a trellis network wherein processing elements are located at the nodes functionally equivalent to an underlying trellis code graphically represented by interconnection of processing elements at its coordinates. Mathematically, the operation of such a collection can be described by bilinear differential equations. Alternatively, this operation may be viewed as solving for a stable point of a system of bilinear differential equations. Recent advances in very large scale integration (VLSI) technology have made it possible to construct concurrent processor arrays based on a regular array of locally connected processing elements or cells. Besides their obvious useful applications, such processor arrays have the potential of exhibiting behavior characterized by self-organization, learning and recognition.

Even a single layer network including a large number of array cells and associated control presents a structure that is rather complex in terms of architecture and operation. By interconnecting the cells in a trellis network designed in accordance with a convolutional code storing a received sequence, the trellis network is able to minimize a function that is analogous to the log likelihood function for the received sequence near the global minimum Simulations demonstrate that such a network in a paper entitled "A Trellis-Structured Neural Network" by T. Petsche and B. W. Dickinson, NIPS, pp. 592-601, American Institute of Physics, NY, 1988 can successfully decode input sequences containing no noise as well as a globally connected decomposition network or an optimum decoder both of which present considerable fabrication difficulties. In addition, for low error rates, this network can also decode noisy received sequences.

SUMMARY OF THE INVENTION

It is an object of the present invention to provide an output immune to errors that may occur in one or several individual processor elements by providing a trellis network featuring self-repairing capability.

A related object of the invention is to provide a trellis network having stages including an active set of processing elements and a set of spare processing elements each of which is capable of being automatically substituted for anyone of the active processing elements within that stage that has failed.

A further object is to provide a network wherein the level of redundancy is preserved after substitution for a failed processing element thereby maintaining the capability of further substitutions to remedy subsequent failures of processing elements.

The invention takes the form of a network for storing and processing signal representations wherein the network has a plurality of stages which are connected together via a weighting matrix. Each stage has an active set of processing elements and a spare set of processing elements connected together by inhibiting logic cooperating with the processing elements to favor the activation of a single processing element in each stage. The weighting matrix connects the processing means of each stage to all the processing means of adjacent stages via paths wherein selected paths are favored in accordance with an underlying convolutional code. The weighting matrix and the inhibiting logic allows the activation of one processing element in a stage when activated processing elements are interconnected by selected paths through the weighting matrix.

In some of the additional aspects of the invention, the network is in the form of a trellis graph. The processing means have first and second signal inputs connected to the weighting matrix and provides a first output. The processing element includes a threshold circuit responsive to the first output and located at the first signal input.

In some of the further aspects of the invention, the inhibiting circuitry includes an input summer and an output summer respectively receiving inputs and outputs of the processing elements in a given stage. The two summers providing respective inputs to an adder located at the second signal input of each processing element. The weighting matrix comprises four similar multipliers each providing an output responsive to two inputs derived from processing means in different stages.

A feature of the invention is the arrangement wherein a spare processor is substituted for a failed processor within a stage while the paths are activated to neighboring processors in adjacent stages to restore the redundancy of the network to enable additional substitutions in response to further failed processors.

BRIEF DESCRIPTION OF THE DRAWING

Features of the invention and additional objects of the invention will be more readily appreciated and better understood by reference to the following detailed description which should be considered in conjunction with the drawing.

DETAILED DESCRIPTION

Figure 1A:
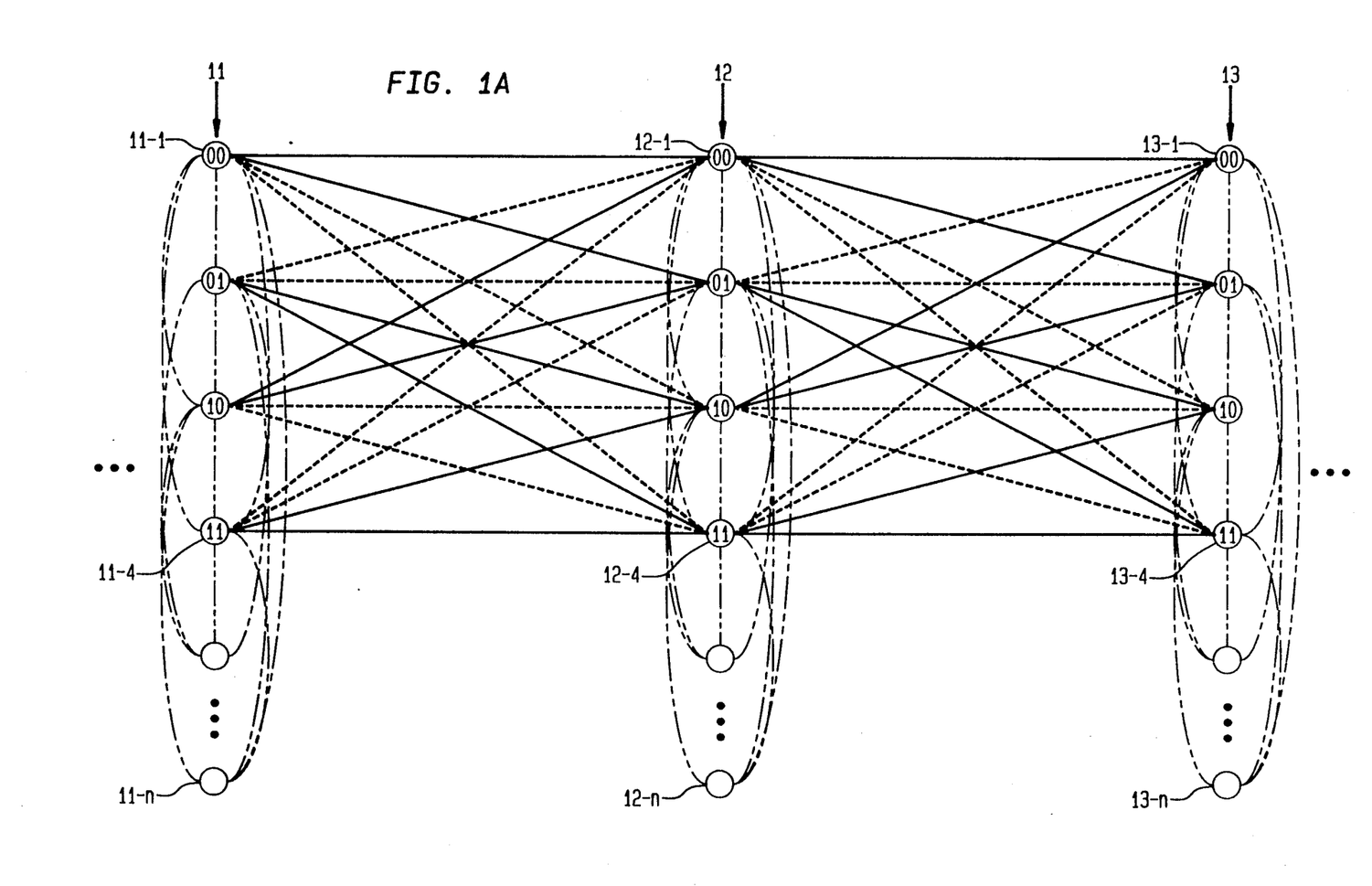
FIGS. 1A & B each illustrate a portion of the basic configuration of a self-repairing trellis network in accordance with the invention wherein the complete connection paths in the network are provided by an overlay of FIGS. 1A & 1B.
Figure 1B:
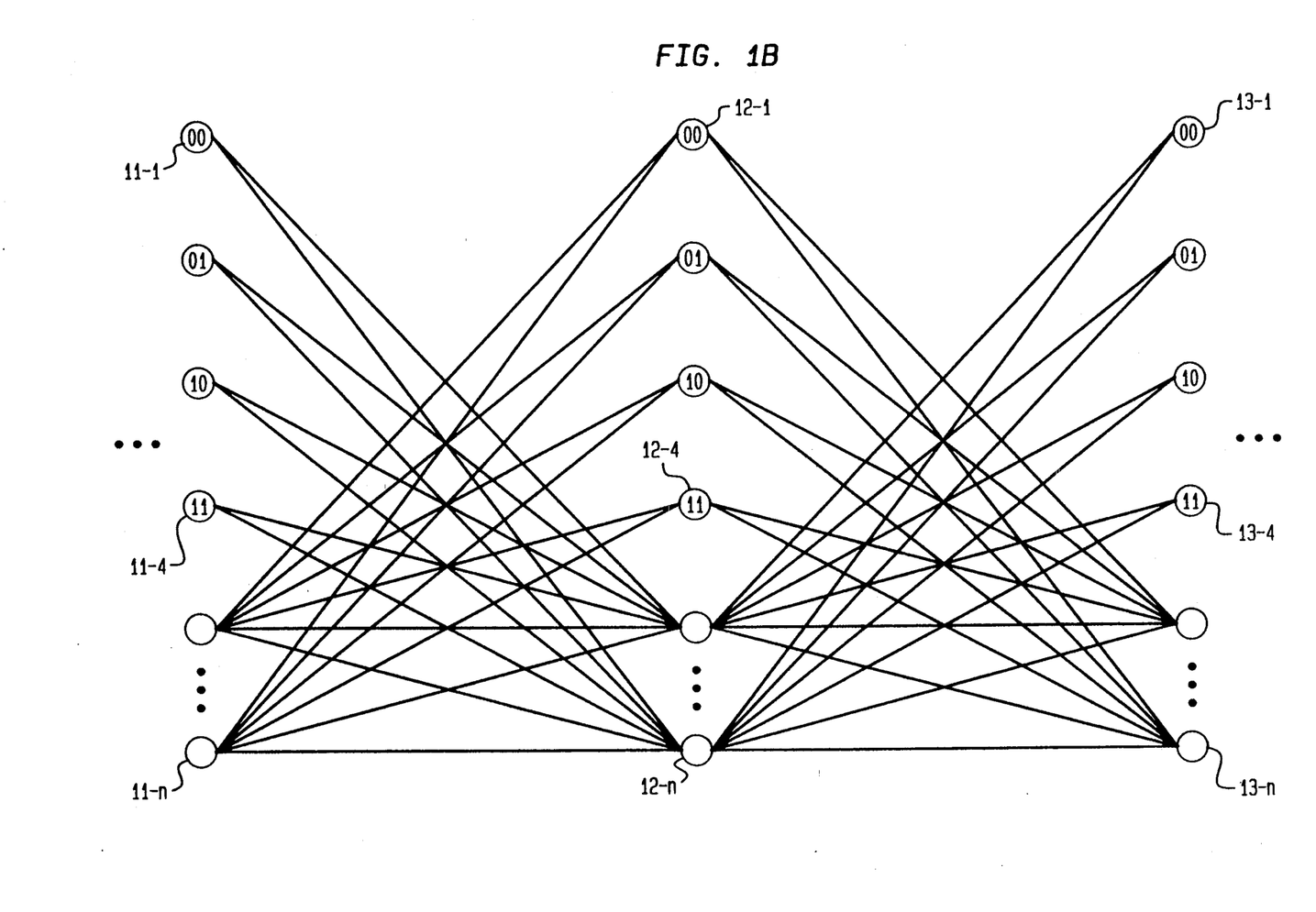

FIGS. 1A and 1B when overlayed provide a symbolic representation of a self-repairing trellis network. The basic or underlying arrangement in FIG. 1A includes stages 11, 12 and 13 each comprising n cells or processing elements (PE's) designated 11-1 through 11-n in stage 11, 12-1 through 12-n in stage 12, and 13-1 through 13-n in stage 13. In each stage, the four upper cells are the regularly working or active cells while the lower two are spare cells or spare processing elements. Although the cells are actually analog processing elements, each activation of a cell by turning it 'on' is indicative of a digital state. Furthermore, they multiply two signals together and, hence, are bilinear. For example, the dash-one cells, that is 11-1, 12-1, and 13-1, for each of the three stages are indicative of a binary state of 00. The dash-two cells in the three stages indicate a binary state of 01. While a binary state of 10 is indicated by each of the dash-three cells, the dash-four cells indicate a binary state of 11.

The solid straight line connections in FIG. 1A correspond to a trellis graph which is a regular pattern expandable both in the number of cells in a stage as well as the number of stages. These solid lines are allowed or legal paths, also called edges in the trellis graph—they are excitatory interconnections in the trellis network. The dashed lines are illegal paths (no edges between the two nodes) in the trellis graph—they are inhibitory connections in the network. As long as the cells are activated in a signal sequence in accordance with an appropriate convolutional code, in this case a rate 1/n, K=3 code, all activated cells are linked by excitatory connections in the trellis network and the corresponding nodes in the trellis graph are connected by allowed paths or edges. When applying an input sequence, a zero bit is added at the beginning and the end of the sequence. Then, bit pairs are mapped onto the network slipping only a single bit between each overlapped bit pair. Of course, with other convolutional codes, these parameters would change accordingly with a corresponding change in the network pattern to those appropriate for the particular code selected.

FIG. 1B, which actually provides additional connections to those illustrated in FIG. 1A, completes a rather symbolic representation of a self-repairing trellis network. The straight-line paths in FIG. 1B provide the connections for enabling a spare cell or PE to be substituted for anyone of the active PE's that is failed. Also evident in FIG. 1B is that the number of spare or backup cells within the stages may be selected to provide a desired reliability factor.

Although a variety of specific implementations are possible, each PE in an illustrative embodiment of the network is described by a differential equation:

$$\dot{u}_{i,j} = -Au_{i,j} + (B - u_{i,j})(f(u_{i,j}) + I_{i,j}) - \qquad (1)$$

$$(G + u_{i,j})\left(J_{i,j} + \sum_k f(u_{i,k})\right)$$

Where $x_{i,j} = (f(u_{i,j})$ is the output of PE j in stage i;

$I_{i,j}$ and $J_{i,j}$ are inputs to PE (i,j) that are derived from sources other than the PE's in stage i;

f(u) is an arbitrary nonlinear, non-decreasing function of u; and

A, B, and C are arbitrary constants.

Figure 2:
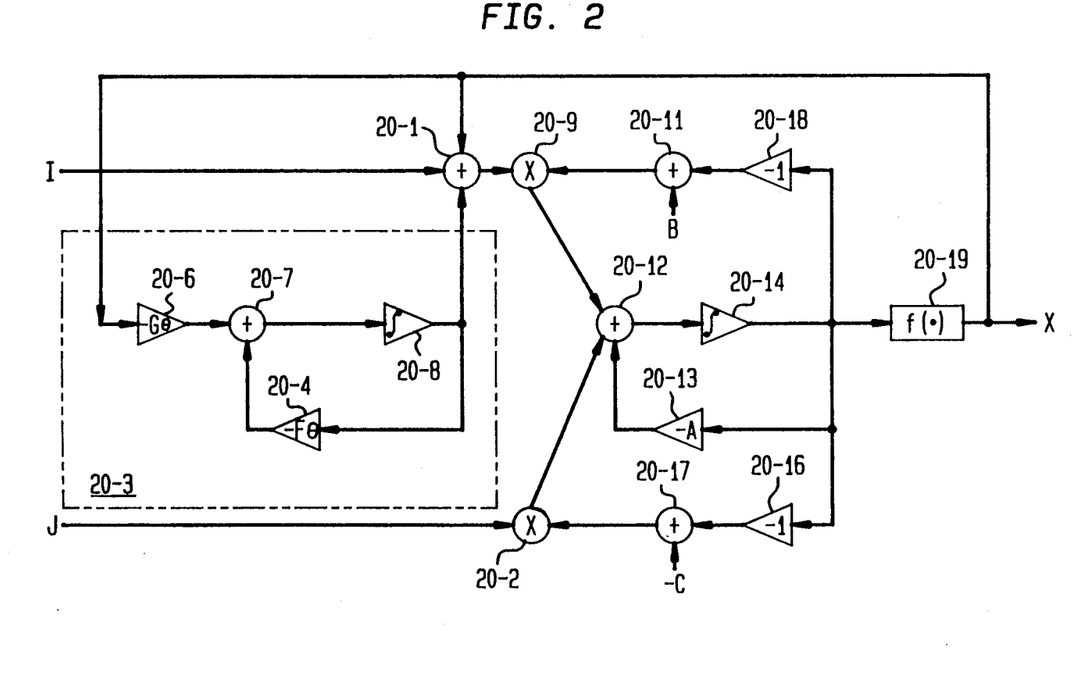
FIGS. 2 and 3 are a respective circuit diagram and block symbol for a processing element or cell.
Figure 3:
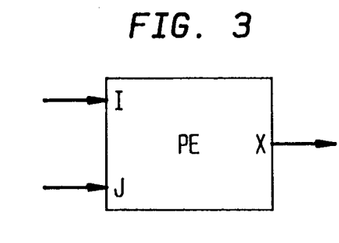

A suitable circuit diagram for a PE is presented in FIG. 2 and simply indicated as a block according to FIG. 3.

Figure 4:
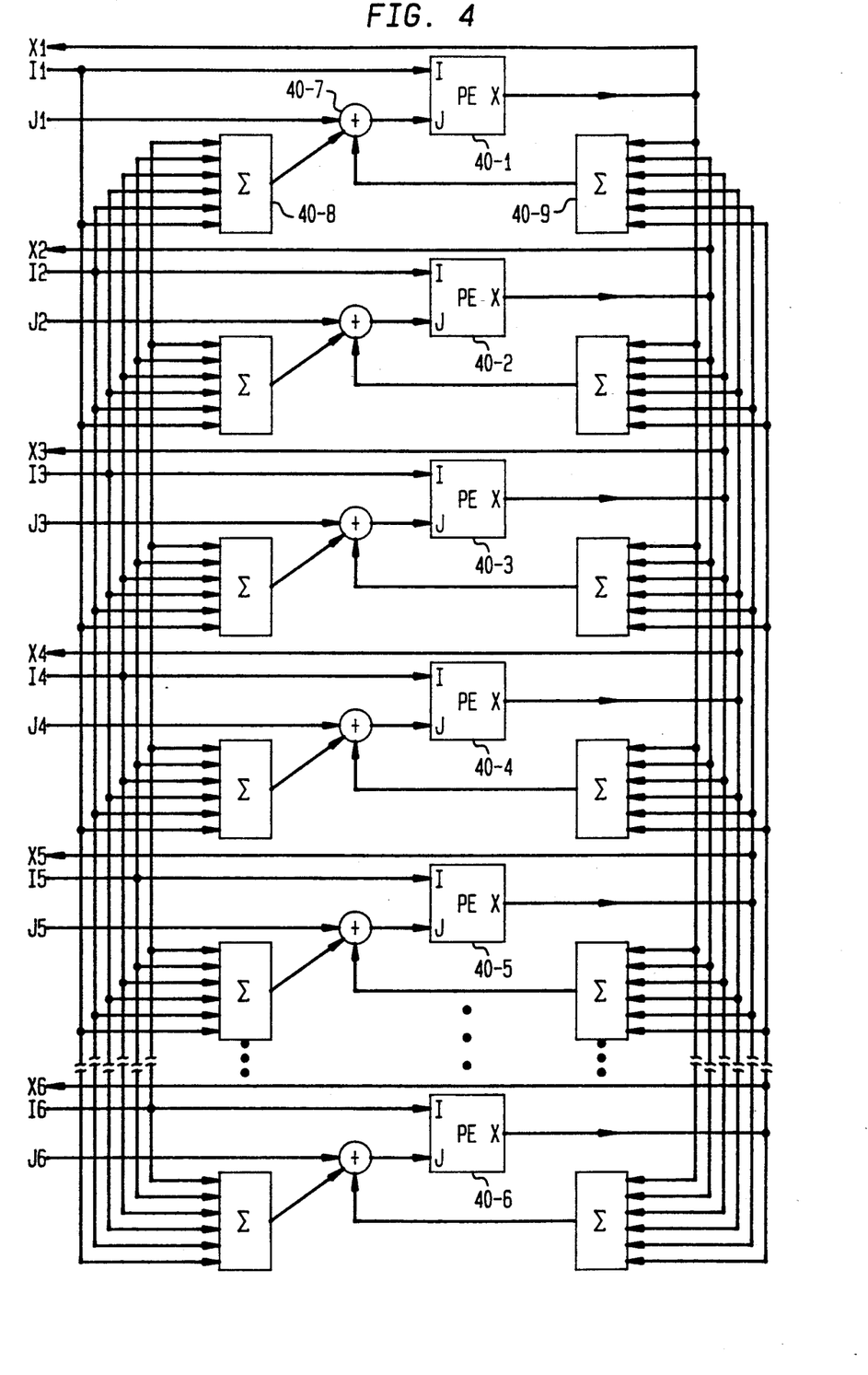
FIG. 4 illustrates an arrangement of a single stage including a plurality of processing elements.

Each stage of the trellis network contains M+N PE's. Each PE in a stage is connected to every other PE in the stage by mutually inhibitory connections that have constant magnitude, assumed in foregoing equation (1) to be unity. A block diagram of a single stage implemented in this way is shown in FIG. 4.

A trellis network comprises a set of S stages interconnected in such a way that every PE in each stage is connected to every PE in the 2 (K−2) stages nearest to that stage. In other words, if the network is viewed as a linear array of stages, as shown in FIG. 1, then each PE stage i is connected to each PE in stage i−(K−2), ..., i−1, and i+1, ..., i+(K−2). Each of these interstage connections has four components, $w_{i,j,m,n}{}^+$, $w_{i,j,m,n}{}^-$, $w_{m,n,i,j}{}^+$, and $w_{m,n,i,j}{}^-$.

The trellis network also has a "threshold" $\theta_{i,j}$ for each PE so that the output of each PE in an illustrative embodiment of the trellis network is given by inserting the following definitions into the differential equation (1):

$$I_{i,j} = \sum_m^{N+M} \sum_{n=1} w^+_{i,j,m,n} x_{m,n} + \sum_k \sum_l w^{ex}_{i,j,k,l} I_{k,l} + (1 - \Theta_{i,j}) \qquad (2)$$

$$J_{i,j} = \sum_k I_{i,k} + \sum_m^{N+M} \sum_{n=1} w_{i,j,m,n} x_{m,n}$$

Figure 5:
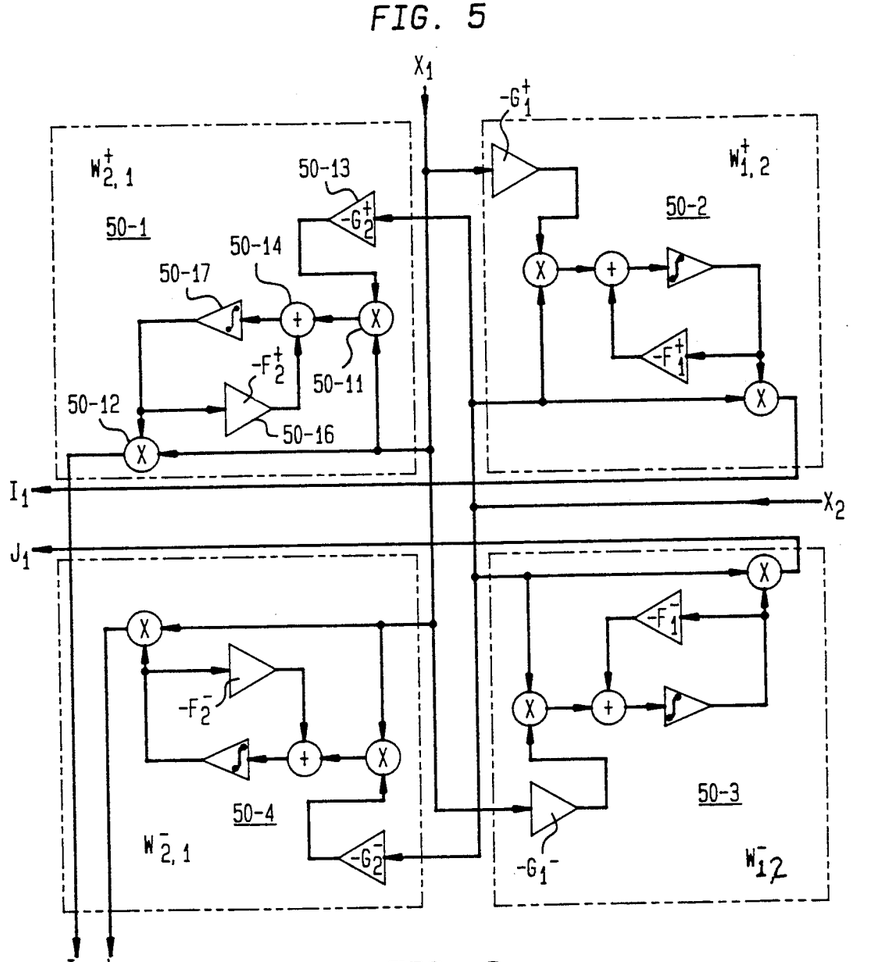
FIGS. 5 and 6 are a respective circuit diagram and block symbol for variable weights used to establish connection paths between processing elements in different stages.
Figure 6:
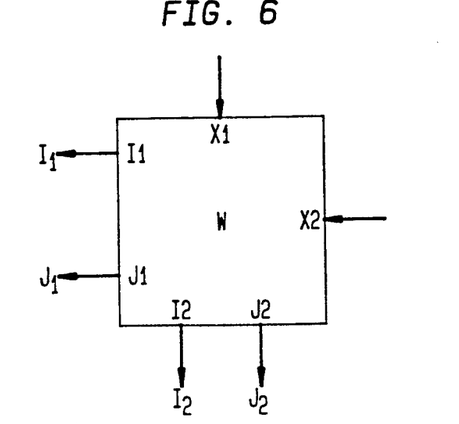

An implementation of these modifiable weights is depicted in FIG. 5 and as a block in FIG. 6.

As was previously stated, for the special case of K=3, the trellis network derives from a trellis graph, for a rate 1/n, code with constraint length K, there are $2^{K-1}$ distinct states in each stage of the trellis graph. Thus, there are $N=2^{K-1}$ active PE's per stage of the trellis network and M spare nodes. M is chosen to provide the desired level of fault tolerance.

The initial value of the interstage connection weights are determined by an associated trellis graph representation of a trellis code. Such a trellis graph can be viewed as containing S sets of nodes with each set representing the N possible states of the encoder at a single instant in time. For each stage, each node is mapped onto one of the first N PE's in the corresponding stage of the trellis network. No nodes are initially mapped onto the remaining M PE's in each stage, which are designated as "spare PE's". Whenever a pair of nodes in the trellis graph is connected by an edge, the connection weights for the corresponding pair of PE's is initialized so that $w_{i,j,m,n}{}^+ > w_{i,j,m,n}{}^-$ and $w_{m,n,i,j}{}^+ > w_{m,n,i,j}{}^-$. If a pair of nodes in the trellis graph is not connected by an edge, then the connection weights for the corresponding PE's are initialized so that $w_{i,j,m,n}{}^+ < w_{i,j,m,n}{}^-$ and $w_{m,n,i,j}{}^+ < w_{m,n,i,j}{}^-$.

The thresholds are initialized so that $\theta_{i,j} \approx 1$ if the PE corresponds to a node in the trellis graph and $\theta_{i,j} \approx 0$ if the PE does not correspond to a node (i.e., it is a "spare"). In addition, all the connection weights on connections leading to or from "spare" PE's are initialed so that they are approximately zero.

Figures 7, 7A:
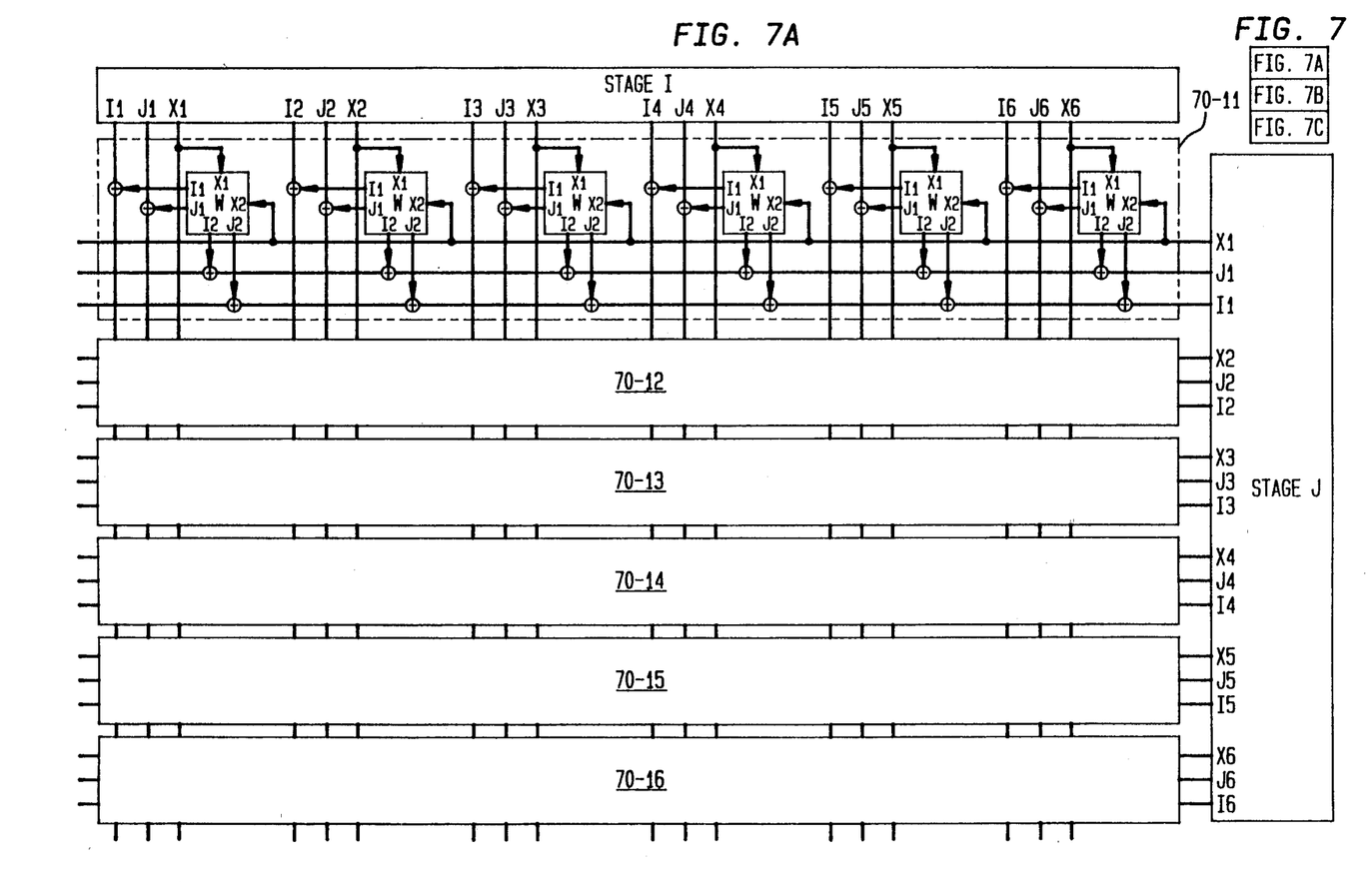
FIGS. 7A, 7B and 7C, when arranged according to FIG. 7, provide a detailed block schematic diagram corresponding to the symbolic arrangement of FIGS. 1A and 1B.
Figure 7B:
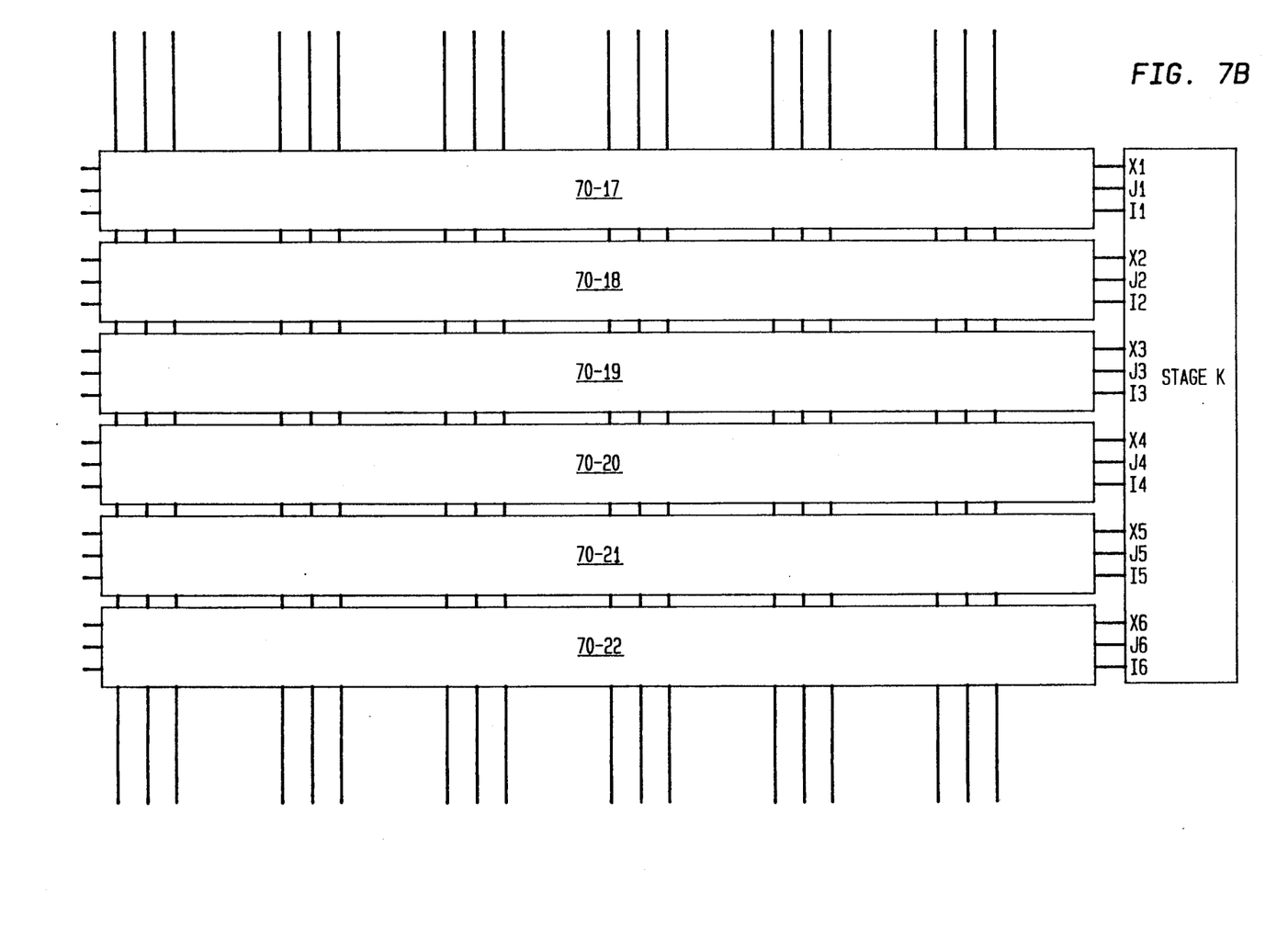
Figure 7C:
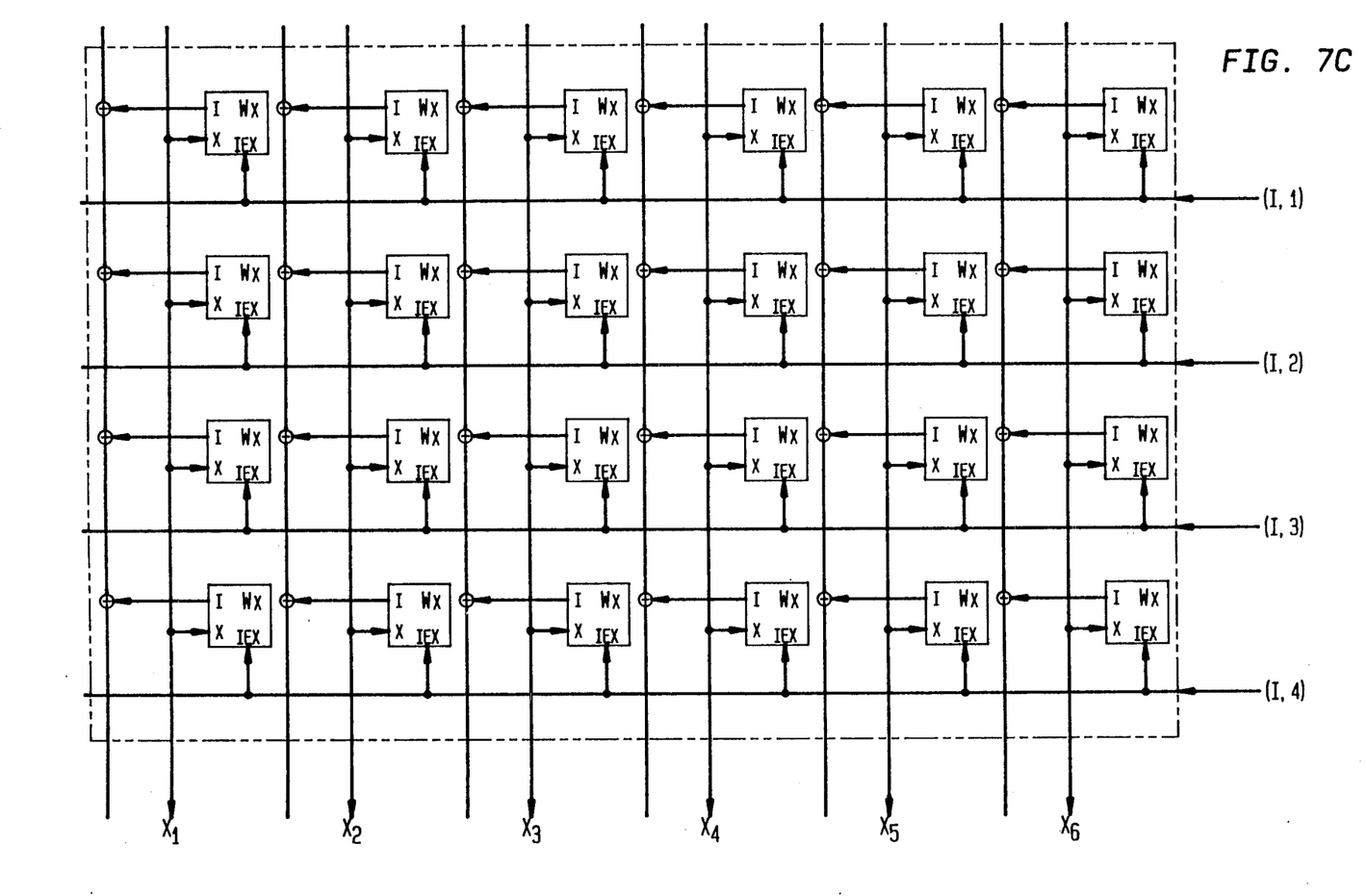

After all the weights and thresholds are initialized at time t=0, the network illustrated in FIGS. 7A, 7B, and 7C is started and the $u_{i,j}$ and $x_{i,j}$ change according to the rules governing them. The weights are also modified according to an adaptation rule that is based on correlations between the outputs of PE's. An excitatory weight is increased whenever the two PE's it connects are activated or 'on' at the same time. An inhibitory weight is increased whenever the two PE's it connects are in different states. In the current model, the weights are updated according to the following differential equations:

$$\overset{\circ}{w}{}^{ex}_{i,j,k,l} = -F^{ex} w_{i,j,k,l} + G^{ex} x_{i,j} I_{k,l} \quad (3)$$

$$\overset{\circ}{w}{}^{+}_{i,j,k,l} = -F^{+} w_{i,j,k,l} + G^{+} x_{i,j} x_{k,l}$$

$$\overset{\circ}{w}{}^{-}_{i,j,k,l} = -F^{-} w_{i,j,k,l} + G^{-} x_{i,j}(1 - x_{k,l})$$

The thresholds are continuously modified so that $(1-\theta_{i,j})$ decreases whenever a PE is 'on' and increases whenever a PE is 'off'.

$$\overset{\circ}{\theta}_{i,j} = -F^{\Theta}\theta_{i,j} + G^{\Theta}x_{i,j} \quad (4)$$

When all the nodes are functioning properly, the network will represent a data item as a set of 'on' PE's (i.e., a set of PE's for which $x_{i,j} \approx 1$) and a set of 'off' PE's (i.e., $x_{i,j} \approx 0$). In each representation of a data item, exactly one PE in each stage will be 'on', the remainder will be 'off'. All the PE's that do not correspond to a node in the trellis graph will be 'off'. If a PE is 'on', then the corresponding node in the trellis graph lies on the path representing the data item. Each path through the trellis graph that corresponds to a data item will differ from all other paths that correspond to data items by a minimum number of nodes, which is $K-1$ for $K>2$ and rate 1/n. Due to the correspondence between nodes and PE's, each "activation pattern" of 'on' and 'off' PE's that represents a data item (a "legal or allowed activation pattern") will differ from any other legal activation pattern by at least $K-1$ for $K>2$ PE's.

If a PE that corresponds to a node in the trellis graph fails (e.g., if we fix $x_{i,j}=0$ for all $t>T$), then if $K>2$, each data item still is represented by a unique activation pattern. Therefore, a trellis network, even one in which M=0 is fault tolerant.

By using the adaptive thresholds and weights defined earlier, however, the network can not only tolerate errors, but "repair" them as well. When a PE that corresponds to a node in the trellis graph fails, the failure is "repaired" by modifying the connection weights for one of the PE's that does not originally correspond to a node in the trellis graph so that the weights are similar to the weights connecting the PE that failed. That is, if the j-th PE in the i-th stage fails at time $T_f$, and it is replaced by the k-th PE in stage i, then at time some time $t>T_f$ it must be true that $$w^{+}_{i,k,m,n}(t) \approx w^{+}_{i,j,m,n}(T_f^-) \quad (5)$$

$$w^{-}_{i,k,m,n}(t) \approx w^{-}_{i,j,m,n}(T_f^-)$$

$$w^{+}_{m,n,i,k}(t) \approx w^{+}_{m,n,i,j}(T_f^-)$$

$$w^{-}_{m,n,i,k}(t) \approx w^{-}_{m,n,i,j}(T_f^-)$$

The designation $T_f^-$ is used herein, that is T with a superscript minus and subscript 'f'. This designation indicates a time just before the failure which occurs at $T_f$. Alternatively, it may also be written as $(T_f - \Delta T)$ where $\Delta T$ is very small but nonzero. If a PE that does not correspond to a node in the trellis graph fails, no "repair" is necessary and none occurs.

A self-repairing trellis network can be used to build a large network capable of useful computations. In this case, the inputs to the PE's in one of the trellis networks, $I_{i,j}$ (defined earlier) are derived from the output of other trellis networks so as to compute various functions. For example, to realize the identity mapping, the outputs of one of the networks $x^{net1}_{i,j}$ used as inputs to a following trellis network with $w_{i,j,i,j}^{net2,net1}(0)=1$ and all other $w_{i,j,m,n}^{net2,net1}(0)=0$, such that $$I^{net2}_{i,j} = \sum_{k=1}^{S} \sum_{l=1}^{N+M} w^{+}_{i,j,k,l} x^{net2}_{k,l} + \sum_{m=1}^{S} \sum_{n=1}^{N+M} w^{net2,net1}_{i,j,m,n}(t) x_{m,n} \quad (6)$$

Where the designation $I_{i,j}^{net2}$ is $I_{1,2}$ for the j-th PE in the i-th stage in layer 'net2'. In general, a superscript 'net1' indicates that the variable applies to a PE in layer 1. A superscript of the form "netI,netJ" indicates that the weight applies to a connection between a PE in layer I and another PE in layer J. The letter w without a superscript of the form "netI,netJ" applies to a connection between neurons in the same layer. That is, the $w^+$ above is assumed to have a superscript "net2,net2".

The identity mapping can be viewed as a method of error detecting and correcting data transmission that represents data as a two dimensional spatial sequence rather than as a one dimensional temporal sequence. This might be used, for example to allow communications between stacked integrated circuits by two dimensional arrays of LED's and photo receptors. In accordance with neural network techniques each array may be thought of as a layer and the PE's of one layer are coupled to corresponding PE's in another layer and so on as need be. Of course, this same method may be used to communicate between any other transmitter and receiver using other methods of connections such as simple wires. Since messages will be distributed both in space and time, there will be a gain in transmission speed over a system that uses a single communications line. Of course, a communications system that uses the trellis network will always be able to detect and correct failures in the transmitters or communications media. The failure replacement scheme in the trellis network provides redundant elements and communications channels to replace future failures in a way that is automatic without requiring external control.

Figure 8:
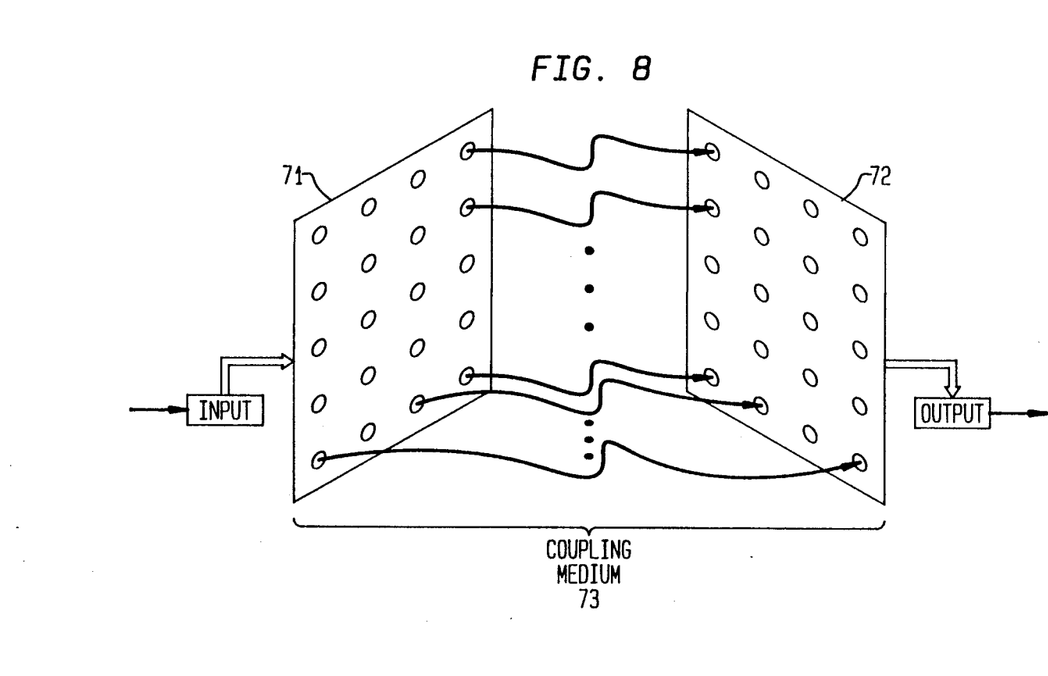
FIG. 8 provides a highly paralleled transmission application of the invention between two network layers via multiple optical communication paths.

FIG. 8 provides a typical application of the principles of the present invention for communication wherein a two dimensional array of LED's of a transmitter 71 are individually coupled to a similar geometric two dimensional array of photodetectors in a receiver 72 via a multiple channel optical coupling medium 73. Each LED is responsive to the output of a PE while each photodetector, or photoreceptor, provides an external input to a PE. In such a system, the presence of channel noise and the possibility of failures of the LED's or photodetectors results in transmission errors. Self-repairing trellis networks in the form of a two layer system provides correct transmission between the input and input in the presence of channel noise and failures in transmitters 71 and receiver 72.

In the use of a typical conventional code, error correction is introduced by adding redundancy that is spread over time usually by adding more bits which increases transmission time. The trellis network introduces redundancy that is spread over space using a two dimensional structure of a trellis graph. In terms of transmission capacity, an arrangement in accordance with FIG. 8 provides multiple symbol/character transmission at the same time. For example, N-stage two dimensional array is able to transmit N bits simultaneously. A combination of VLSI chips and integrated optics make practical applications of such systems available to those in the art.

FIG. 2 is a diagram of a processing element or cell connected to receive first input I only from sources other than the PE's of its stage respectively applied to adder 20-1. The second input J is from the same stage and other stages since J herein includes $\Sigma_j f(u_{ij})$ and is not the same J as appears in equation (1). Each PE forms a node in the trellis. Other inputs to adder 20-1 are the output signal x and the output of a threshold circuit 20-3 which is derived from x in accordance with equation (4). The respective gain of amplifiers 20-4 (coefficient of gain) and 20-6 (decay constant) provide weighing factors for the output of the threshold circuit and the output x of the PE. Adder 20-7 combines the outputs of amplifiers 20-4 and 20-6 for application to integrator 20-8 which is applied to adder 20-1 as a variable threshold signal. The output of adder 20-1 provides one input to multiplier 20-9 while its other input is from the output of adder 20-11. The output of multiplier 20-9 provides one input to summer 20-12 along with another input from the output of multiplier 20-2. A third input to summer 20-12 is the output of amplifier 20-13. The gain A of amplifier 20-13 defines a rate of decay. The output of summer 20-12 is integrated by integrator 20-14. The output of integrator 20-14 is feed back to multipliers 20-2 and 20-9. For multiplier 20-2, the feedback path includes amplifier 20-16 and adder 20-17. The other input to adder 20-17 is -C which is an lower value of u. For multiplier 20-9, a similar feedback path includes amplifier 20-18 and adder 20-11. The other inputs to adder 20-11 is B which is a lower value of u. The output of integrator 20-14 is applied to function block 20-19 whose output is a function of its input. For convenience, the circuit of FIG. 2 is represented by the block symbol of FIG. 3 in the stage diagram of FIG. 4.

FIG. 4, actually shown with six PE's 40-1 to 40-6, may include any arbitrary number of PE's divided into active PE's, in this case four, and spare PE's which is two. The I external input is applied directly to each PE while the J input is a summation of respective external J input and the outputs of its respective summers obtained from the outputs of all the PE's in a stage and all the I input signals to a stage.

Since all PE's are similarly connected, only the connections of PE 40-1 will be considered. The J input summer for PE 40-1 is summer 40-7. Summer 40-7 receives its respective J1 input along with the outputs of summers 40-8 and 40-9. It should be pointed out that there are five other summers identical to summer 40-8 so that a single unit could serve the function of all units. The same is true for summer 40-9. The group of summers corresponding to summer 40-9 are indicated in FIG. 1A by the curved phantom lines between cells. The outputs of the PE's applied to these summers is fed back as an inhibitory input to each PE. Since the overall purpose of the network is to tolerate faults, redundancy will provide a benefit consistent with this purpose. It should be noted that all stages with the same number of PE's are identical. However, for other networks in accordance with the invention it may be advantageous to those skilled in the art to have different size stages.

FIG. 5 provides a circuit diagram for the interstage connections which comprises four similar components 50-1 to 50-4 respectively providing connection weights of $w_{2,1}{}^+$, $w_{1,2}{}^+$, $w_{1,2}{}^-$, $w_{2,1}{}^-$. Each of components 50-1 to 50-4 has respective single outputs of $I_2$, $I_2$, $J_1$, and $J_2$ and each has two inputs of $x_1$ and $x_2$. Equation (3) in its last two lines provides the mathematical description of the operation for the circuitry of FIG. 5. All four components are represented by the block symbol in FIG. 6.

Since all four weighing components for interstage connection are provided by the operation of similar circuits only component 50-1 will have its internal circuitry described. The $x_1$ signal is applied to the inputs of multipliers 50-11 and 50-12 while the $x_2$ signal is just applied to amplifier 50-13. The output of amplifier 50-13 provides the other input for multiplier 50-11 The output of multiplier 50-11 provides a first input to adder 50-14 while its other input is feedback by amplifier 50-16. The input to amplifier 50-16 is obtained from the output of integrator 50-17 which is fed by adder 50-14. Along with the $x_1$ signal, integrator 50-17 provides the second input to output multiplier 50-12 which provides the $I_2$ signal output. To obtain the $J_2$ output signal from component 50-4, the $x_1$ and $x_2$ are applied thereto in the same manner while for the $I_1$ and $J_2$ output signals, the signals $x_1$ and $x_2$ are reversed at the respective inputs of components 50-2 and 50-3.

In order to obtain the desired self-repairing features of the trellis network, the weight matrix is initialized to a set of weights that is determined by the connections shown in FIGS. 1A and 1B. For the particular trellis shown in FIGS. 1A and 1B, whenever two nodes in FIG. 1A are connected by a solid straight line, the weights between the corresponding PE's are initialized so that $w^+ > w^-$; if two nodes are connected by dashed straight lines, the weights between corresponding PE's are initialized so that $w^- > w^+$. If no line exists between two nodes in neighboring stages in FIG. 1A, the weights between the corresponding PE's are initialized so that $w^+ = w^- = 0$.

These initial weight values restrict the set of paths through the trellis that the network can represent to the set of legal paths through the trellis graph that is used to generate the initial weight matrices. As long as all the PE's function properly, the weights remain approximately equal to their initial values. If a node in stage i fails and there are one or more PE's in that stage that have only zero weights connecting them to other stages, the weights of one of those other PE's will be modified so that they approximate the pattern of weights that connected the failed node to the other stages and to the external inputs. This other PE will then assume the role of the failed PE in the representation of the data.

FIGS. 7A and 7B illustrate the interstage connections between three stages I, J and K which provides details of the interconnection arrangement generally illustrated in FIGS. 1A and 1B so that stages I, J and K actually correspond to stages 11, 12 and 13. FIG. 4 provides the internal circuitry for each of stages I, J and K while FIG. 2 provides the internal circuit for each PE in FIG. 4. Similarly, FIG. 5 provides the details of the four weighing functions which is used at six interconnection points in interconnection block 70-11. Only interconnection block 70-11 has its internal arrangement illustrated since the remaining interconnection blocks 70-12 through 70-22 are identical but have different location with their respective interconnections between the three stages of FIGS. 7A and 7B. Standing alone FIG. 7A illustrates the manner in which two stages are connected via a matrix of weighting circuits according to FIG. 5. These connections are bidirectional and provide two-way connections between the two stages. The overall layout of FIG. 7 which includes FIGS. 7A, 7B and 7C although obviously different from FIGS. 1A and 1B illustrates a more practical arrangement for realization in integrated circuit technology.

Figure 9:
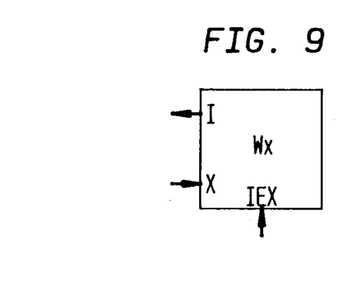
FIGS. 9 and 10 are a respective block symbol and circuit diagram for applying an input to a cell.

FIG. 7C depicts a connection structure for applying weighted external inputs to stage I in FIG. 7A. Actually, each stage in FIG. requires a separate arrangement according to FIG. 7C. The inputs I,1 to I,4 are applied to right in FIG. 7C and serve to turn on the appropriate PE in stage I. The outputs $x_1$ to $x_6$ from stage I are available at the bottom in FIG. 7C. It should be noted FIG. 7C includes twenty-four identical units in accordance with FIG. 9 whose internal circuitry is illustrated in FIG. 10.

Figure 10:
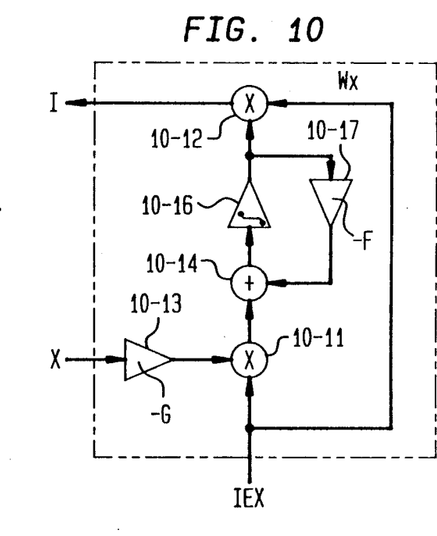

In FIG. 10, the internal input $I_{ex}$ is applied to one input to each of multipliers 10-11 and 10-12. The other input to multiplier 10-11 is provided by amplifier 10-13 which is a weighted portion of the x input. The product output of multiplier 10-11 is applied to adder 10-14. The output of adder 10-14 is fed to integrator 10-16 whose output is applied to the other input of multiplier 10-12 and feedback amplifier 10-17. Multiplier 10-12 provides the output which is applied to a PE in stage I. As previously alluded to the function of the arrangement of FIG. 7C maps inputs onto a stage in the trellis. It should be noted that these inputs to stage I are summed together with any other inputs from the other stages.

Now that a description of the detailed circuits and overall connection arrangement has been provided, a high-level description of a self-repairing trellis network in accordance with the inventive principles will be presented. The mapping arrangement of FIG. 7C in principle turns on a single cell in each stage. Each stage performs contrast enhancement on the set of inputs it receives wherein it identifies the PE which receives the most positive input. Each stage in the self-repairing trellis network is indicative of a single stage in the underlying trellis graph which in turn is based on an underlying trellis code. At the same time the inputs are applied to the respective stages to establish the nodes, the interaction of the trellis graph then activates the connection paths between the nodes. If these connection paths correspond to edges or legal paths, the network response to the input is stable. It should be pointed out that in this arrangement the trellis network represents a very large number of paths simultaneously. Accordingly, the spare PE's play no part since an appropriate combination of the active PE's provides a complete representation on the trellis graph in accordance with a convolutional coding on the input signal combination.

In the self-repairing trellis network even without the presence of spares, the interconnections enforce a large set of legal paths, each of which, in the absence of external inputs, is equally valid and can be viewed as having equal energy. The function of the trellis network is simply to ensure that a path is legal, in the absence of external inputs, the network does not favor any path over any other. Now should one of the 'on' PE's in a stage fail, a spare PE in the same stage will replace it along with the interconnections of the failed PE to the 'on' PE's in the neighboring stages.

Unlike conventional deconvolution networks including graph-type networks, the objective of the trellis network is to converge to a unique final state. In conventional deconvolution applications, the desired final state is the path through the trellis that is a minimum distance from the received bit sequence.

From another perspective, one can compare a self-repairing trellis network with fixed connection weights and without spare PE's to a deconvolution network with fixed connection weights. For a conventional deconvolution network, if there are no external inputs and the PE's are each initialized to an output half-way between zero or 'off' and one or 'on', the network will converge to a single path through the trellis corresponding to a sub-optimum maximum likelihood estimate of the received sequence On the other hand, if a self-repairing trellis network has no external input and all PE's are initialized to a half-way output condition, the network will converge to a final state in which all the active PE's have the same output which will be close to zero. In the absence of external inputs, the trellis network has no logical disposition to select one path over other possible paths and thus selects none.

A learning algorithm for the interstage weights is such that when a replacement is made, the weights are modified to enforce the new representation of the legal paths between the node represented by the replacement and the nodes in the neighboring stages. This algorithm actually tracks changing representations. In this arrangement, the initial weights and the adaptation of the weights enables the trellis network to change the representation of the information. This is unlike prior art neural networks which learn a concept or representation that remains fixed particularly if sufficient redundancy is present in the representation to preserve its characteristic. The trellis network utilizes the redundant information in the representation to implement the replacement of failed PE's with spare PE's. After the replacement, the representation maintains the same level of redundancy that was present before the failure.

There has thus been shown and described an illustrative embodiment of a self-repairing trellis network in accordance with the inventive principles which fulfills all the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

I claim:

1. A network for storing and processing signal representations, the network comprising:
a plurality of stages and weighting matrix means interconnecting stages together;
each stage comprising a plurality of processing means grouped into two sets wherein one set includes active processing means and a second set includes spare processing means, the active processing means being nodes in the network, and the weighting matrix means connecting each node in a stage via paths to all the nodes in adjacent stages wherein selected paths according to an underlying convolution code are favored over remaining paths;

inhibiting means connecting the processing means of the two sets together, the inhibiting means cooperating with the processing means to favor the activation of a single processing means in each stage; and the weighting matrix means allowing only the activation of one processing means in a stage when activated nodes in different successive stages are interconnected by selected paths through the weighting matrix means.

2. A network according to claim 1, wherein the processing means comprises a first signal input and a second signal input and a first output, the first signal input being providing by the weighting matrix means and the second signal input being responsive to the weighting matrix means, threshold means responsive to the first output for controlling the response of the processing means to the first signal input, and bilinear circuitry producing the first signal output of the processing means.

3. A network according to claim 2, wherein the inhibiting means comprises input summing means and output summing means, the input summing means connected to receive the first signal input to the processing means in a stage and providing a second input to adding means having a first input connected to receive the second signal input, said adding means providing a second input to the processing means, the output summing means connected to receive the first signal output for each processing means in a stage and providing a third input to the adding means whereby the inhibiting means uses the inputs and outputs of the processing means in each stage to allow only one processing means to be activated.

4. A network according to claim 1, wherein the weighting matrix means comprises four multiplying means each providing an output responsive to the outputs of corresponding processing elements each in a different stage adjacently located in the network, two multiplying means each providing a first signal input for processing means via paths corresponding to the selected paths for activation while two multiplying means each providing a second signal for processing means via the remaining paths which when activated leading to a change in activation of a processing means.

5. A network according to claim 1, wherein the input means are connected to each stage via the weighting matrix means for mapping an input signal combination in accordance with a convolutional code corresponding to that of the weighting matrix means to provide each one of the signal representations.

6. A network according to claim 5, wherein the input means comprises a plurality of weighting means each having an internal input and a feedback input from an associated processing means, the weighting means forming a product of an internal input signal thereof and a feedback signal to be integrated as a first output component, and the weighting means having an output multiplier for taking the product of the first output component and the internal input for being applied to the first input of its respective processing means.

7. A network according to claim 5, wherein each stage has its corresponding input means.

8. A network according to claim 7, wherein corresponding processing means in the first and second layers are coupled via individual optical coupling paths.

9. A network according to claim 1 along with a second trellis network comprising at least two layers of two dimensional networks wherein the processing means of one layer provides an output that is coupled to a corresponding processing means of a second layer.

10. A network according to claim 1, wherein the paths between nodes of adjacent stages are in the form of a trellis graph.

11. A network according to claim 1 further comprising additional paths between each spare processing means of one stage and the active processing means of stages adjacent to the one stage wherein the inhibiting means and the weighting matrix means detect a failed processing means among the set of active processing means of the one stage and activate a spare processing means to operate as a replacement for the failed processing means including activation of selected ones of the additional paths for restoring a selected path through the weighting matrix means thereby restoring capability for subsequent operational replacements after failure of an additional active processing means in any one of the stages by a spare processing means in that stage.

* * * * *

UNITED STATES PATENT AND TRADEMARK OFFICE
CERTIFICATE OF CORRECTION

PATENT NO. : 5,151,969
DATED : September 29, 1992
INVENTOR(S) : Petsche

It is certified that error appears in the above-indentified patent and that said Letters Patent is hereby corrected as shown below:

On the Title page, col. 2, following "Assistant Examiner-Roger S. Joyner" insert --Attorney, Agent or Firm-Adel A. Ahmed--.

Signed and Sealed this

First Day of February, 1994

Attest:

BRUCE LEHMAN

Attesting Officer     Commissioner of Patents and Trademarks